US010343363B2

(12) United States Patent
Heinrich et al.

(10) Patent No.: US 10,343,363 B2
(45) Date of Patent: Jul. 9, 2019

(54) PUNCH FOR A ROTARY PRESS

(71) Applicant: Fette Compacting GmbH, Schwarzenbek (DE)

(72) Inventors: Thomas Heinrich, Stelle (DE); Stefan Luedemann, Hamburg (DE)

(73) Assignee: Fette Engineering GmbH, Schwarzenbek (DE)

( * ) Notice: Subject to any disclaimer, the term of this patent is extended or adjusted under 35 U.S.C. 154(b) by 0 days.

(21) Appl. No.: 15/660,062

(22) Filed: Jul. 26, 2017

(65) Prior Publication Data

US 2018/0029323 A1 Feb. 1, 2018

(30) Foreign Application Priority Data

Jul. 26, 2016 (DE) ........................ 10 2016 113 724

(51) Int. Cl.

| | |
|---|---|
| ***B29C 43/08*** | (2006.01) |
| ***B30B 15/06*** | (2006.01) |
| ***B30B 11/04*** | (2006.01) |
| ***B30B 15/30*** | (2006.01) |
| ***B30B 11/08*** | (2006.01) |
| ***B30B 15/00*** | (2006.01) |

(52) U.S. Cl.

CPC ............ *B30B 15/065* (2013.01); *B30B 11/04* (2013.01); *B30B 11/08* (2013.01); *B30B 15/0076* (2013.01); *B30B 15/302* (2013.01)

(58) Field of Classification Search

CPC ......... B30B 11/00; B30B 11/08; B30B 15/30; B30B 15/32; B29C 43/08

USPC .......................................................... 425/345

See application file for complete search history.

(56) References Cited

U.S. PATENT DOCUMENTS

| | | | | |
|---|---|---|---|---|
| 6,056,532 | A | 5/2000 | Pagel | |
| 7,824,170 | B2 * | 11/2010 | Meissner | B30B 11/08 425/345 |
| 8,137,089 | B2 | 3/2012 | Schikowski et al. | |
| 8,490,529 | B2 | 7/2013 | Meissner et al. | |
| 2004/0131717 | A1 * | 7/2004 | Shimada | B30B 11/08 425/345 |
| 2011/0000272 | A1 | 1/2011 | Meissner et al. | |
| 2014/0298986 | A1 | 10/2014 | Blaszczykiewicz | |

FOREIGN PATENT DOCUMENTS

| | | | |
|---|---|---|---|
| CN | 2081795 | U | 7/1991 |
| DE | 6933344 | U | 1/1970 |
| DE | 2948242 | A1 | 6/1981 |
| DE | 102008053453 | B4 | 5/2011 |
| EP | 2269813 | A2 | 1/2011 |

(Continued)

OTHER PUBLICATIONS

European Patent Application No. 17170464.6; Filing Date Oct. 5, 2017; European Search Report; dated Dec. 13, 2017 (7 pages).

*Primary Examiner* — Joseph S Del Sole
*Assistant Examiner* — Thu Khanh T Nguyen
(74) *Attorney, Agent, or Firm* — Barclay Damon LLP

(57) ABSTRACT

A punch for a rotary press comprises a shaft with a punch tip at a first end of the shaft and a punch head at the second end of the shaft. The punch head further comprises a mirror surface and a cylindrical surface, as well as intermediate region between the mirror surface and cylindrical surface. The mirror surface defining a central recess surrounded by an annular mirror surface section.

15 Claims, 5 Drawing Sheets

(56) References Cited

FOREIGN PATENT DOCUMENTS

| | | | |
|---|---|---|---|
| EP | 2111972 | B1 | 1/2015 |
| GB | 2466963 | A | 7/2010 |
| JP | H0584277 | A | 6/1993 |
| WO | 2013021609 | A1 | 2/2013 |

* cited by examiner

PUNCH FOR A ROTARY PRESS

CROSS REFERENCE TO RELATED INVENTION

This application is based upon and claims priority to, under relevant sections of 35 U.S.C. § 119, German Patent Application No. 10 2016 113 724.3, filed Jul. 26, 2016, the entire contents of which are hereby incorporated by reference.

BACKGROUND

The invention relates to a punch for a rotary press comprising a shaft with a punch tip at one end of the shaft and a punch head at the other end of the shaft, wherein the punch head has a mirror surface and a cylindrical surface, as well as an intermediate region between the mirror surface and cylindrical surface.

Rotary presses have a plurality of upper and lower punches which can be assigned in pairs to a cavity of a die plate of the rotor of the rotary press. While the rotor is rotating, the cavities are filled with the filling material to be pressed. In a pressing apparatus, the upper and lower punches are pressed against each other in the cavities to press the filling material into pellets or tablets. The punch tips enter into the cavities, whereas the punch heads located at the other end of the shaft generally interact with pressure rollers of the pressing apparatus. In addition, while the rotor of the rotary press is rotating, the axial movement of the punches can be controlled by control cams that interact with the punch heads.

The mechanical contact of the top side of the punch head with the pressure rollers is along a so-called contact region. The contact region can be divided into two sub-regions. On the one hand, this is the intermediate region between the cylinder surface and the mirror surface of the punch. The first mechanical contact between the pressure roller and the punch head occurs in this region upon entry into the pressing apparatus. During the continued entry of the punch into the pressing apparatus, the pressure rises to the maximum value. The second sub-region is formed by the mirror surface of the punch head, i.e., a flat surface in the middle of the top side of the punch head. While the pressure roller is interacting with the mirror surface, the pressure remains at its maximum value. The diameter of the mirror surface also determines the so-called pressure hold time. The pressure then decreases upon leaving the pressing apparatus and the associated renewed contact with the intermediate region until the punch leaves the pressing apparatus and hence contact with the pressure roller.

Punch heads and in particular their mirror surfaces are the subject matter of the standard DIN ISO 18084:2012-08. Accordingly, the mirror surface is designed flat and circular. Punch heads with such a mirror surface represent the most frequent application. A corresponding punch is for example known from EP 2 111 972 B1. The outer contour of the flat mirror surface can also deviate from the circular shape known from the standard.

Such punches are distinguished by enormous stability which can easily withstand the loads arising from very high pressure while the rotary press is operating. If a punch failure occurs, it has however been revealed that this frequently proceeds from the middle of the mirror surface. In addition, traces of wear occur with the known punches in the region of the middle of the running surface of the pressure roller, which can necessitate an earlier exchange of the pressure roller. In addition, a defective punch transfers its material into the running surfaces of the pressure rollers that interact with this punch. This in turn presses into the other punches which can cause the entire punch set to be damaged in a chain reaction.

In addition to the aforementioned punches with a closed mirror surface, special punches are also known with through-holes in the region of the mirror surface. These holes generally serve additional functions such as the actuation of a clamping mechanism for punch inserts. Such a punch is known from DE 10 2008 053 453 B4. An associated problem is that, by introducing the holes, mechanical stress overloads are generated at the edge of the hole. Due to these stress overloads, the maximum durability and hence the life of the punch decreases. The life of the pressure roller also decreases due to the stress overload at the edge of the hole. Depending on the depth of the hole, the regions of the punch head and punch shaft are weakened by the hole. The cleanability of the punch is also impaired by the through-hole.

Based on the presented prior art, the object of the invention is therefore to provide a punch of the aforementioned type with a longer life that leads to reduced wear of the pressure rollers of a rotary press during operation.

BRIEF SUMMARY OF THE INVENTION

For a punch of the aforementioned type, the invention achieves the object in that the mirror surface has a central recess which is surrounded by an annular mirror surface section.

The punch comprises a shaft, at one end of which the punch tip is arranged that enters the respective cavity in the die plate while the rotary press is operating. In an embodiment, the punch head is located at the other end of the shaft and has an upper mirror surface and a cylindrical surface that are connected to each other by a rounded intermediate region. A conical region can be provided between the cylindrical surface and the punch shaft. The punch shaft can have a punch neck following the punch head and can have a smaller diameter than the other shaft region. At least the punch head, in particular the entire punch, can be designed as a single part.

In an embodiment, the mirror surface has a central recess, which can be bordered by an in particular flat annular mirror surface section. In the region of the mirror surface section, the pressure is substantially constant from the interaction with the pressure rollers of the rotary press. The central recess possesses a closed base like a bay and is hence not a through-hole in which a clamping bolt, or other similar fastener is arranged. The recess can for example be curved concavely. The punch head including its annular mirror surface section as well as its central recess can be rotationally symmetrical. The central recess can be correspondingly circular and surrounded by a preferably annular mirror surface section. The mirror surface section can also possess a ring shape which deviates from the ring shape.

The recess introduced into the mirror surface region according to the invention improves the mechanical properties of the punch head during operation. The recess is designed to reduce weak points in the mirror surface. In this regard, the recess has a geometry which improves the contact conditions between the mirror surface and a pressure element of a pressing apparatus, in particular a pressure roller, as well as the durability of the overall punch structure. The recess improves the maximum durability of the mirror surface and hence the overall life of the punch. In addition, pressure roller wear is reduced.

The invention is based on the insight that pressure rollers roll on the middle of the punch head, or respectively the mirror surface and therefore the middle is particularly stressed while the rotary press is operating. In particular when the punches are unguided, i.e., arranged to rotate freely in the respective punch guides, this causes the middle of the mirror surface to experience a particularly high number of pressings (deformation cycles), whereas the intermediate region and the edge of the mirror surface are loaded less strongly due to the statistically distributed rotary position of the punches in the punch guides. This causes the aforementioned punch failure starting from the middle of the mirror surface.

On the other hand, the invention is based on the insight that the real contact surface between the punch and pressure roller changes significantly during the pressing process due to the contiguous, flat mirror surface of known punches. When the pressure roller is on the middle of the punch, there is a contact line that runs across the entire width of the mirror surface. When the pressure roller is contrastingly at the beginning or end of the mirror surface, the contact line shortens until it becomes a contact point in the intermediate region. It is a further insight of the inventor that this significant alteration in contact conditions is problematic for the mechanical load on the punch and pressure roller and leads to a strong change in the contact stiffness, in particular since the Hertz surface pressure is inversely proportional to the root of the contact line length.

The mirror surface is decreased by the recess according to the invention. The flat region then forms a ring surface in comparison to which the middle of the punch head topside is recessed so that it no longer comes in contact with the pressure roller during the pressing process. This eliminates the middle of the mirror surface, which is subject to a strong mechanical load in the prior art, and leads to a longer life for the piece. In addition, the explained significant change of the contact line length between the pressure roller and mirror surface that occurs in the prior art during a pressing process is reduced by the recess according to the invention. Overall, the path of contact is even since the length of the contact line decreases in the region of the punch axis by the diameter of the recess. This causes a decrease in the dynamics during operation, and the generated noise is also reduced.

Moreover according to the invention, the running surface of the pressure roller is stressed more evenly since the middle of the running surface which is subject to a particular load in the prior art is relieved by the recess in the mirror surface, and regions adjacent to the middle of the running surface are subject to an additional load. The wear of the pressure roller running surface is also accordingly more homogeneous and reduced overall.

Numerous important advantages are thus achieved by the invention. To begin with, the mechanical durability, or respectively the life of the punch tools is increased in that an advantageous effect is produced on the mechanical stress in the contact region of the punch by the geometric design of the recess. The punch head is subject to a more mechanically even load. The number of deformation cycles and the mechanical stress of the contact region are more homogeneously distributed. Given the reduced change in length of the contact line during the pressing process, more even contact conditions are established. In addition, the mechanical stress on the rotary press is reduced overall. Given the more even and reduced stress on the punch head, the stress on all of the participating contact components of the rotary press is also more even and reduced overall. That is, parts such as pressure rollers, pressure rails, control cams, control ramps, etc., also have a longer life. Accordingly, the life and service intervals of the rotary press are increased. Given the reduced dynamics, the generated noise of the rotary press is also reduced overall.

The recess can have an edge region and a base region, which is surrounded by the edge region. The edge region can be designed frustoconical or conical. The base region can in principle be very small and, in an extreme case, can be substantially punctiform when the edge region possesses a (fully) conical shape.

A tangentially continuous transitional region can be provided between the edge region and mirror surface section. An even and hence less stressing transition of the pressure rollers between the annular mirror surface section and the recess is thereby achieved. The mechanical durability is thereby further increased. Only selecting a suitable geometry for the recess permits the introduction of said recess without endangering the function, in particular the mechanical durability of the punch. In this context, it is possible for the tangential continuity to only exist at the direct transition from the transitional region to the mirror surface section. It is, however, also possible for the entire transitional region to be tangentially continuous, in particular also at the transition to the base region. Given tangential continuity, the radius of the rounded transitional region remains constant over the entire extent of the rounded transitional region. This brings about a further homogenization of the transition of the pressure rollers between the annular mirror surface section and the recess and hence further improves mechanical durability of the punch.

According to another embodiment, the transitional region to the mirror surface section can be continuously curved. It is again possible for the continuous curvature to only exist at the direct transition from the transitional region to the mirror surface section. It is however, also possible for the entire transitional region to be continuously curved. Given a continuous curve, the radius of the rounded transitional region increases constantly, starting from the base region, toward the annular mirror surface section and progresses into infinity at the transition to the annular mirror surface section. Accordingly, a maximum homogenization is achieved of the transition of the pressure rollers between the annular mirror surface section and the recess, and hence improved mechanical durability of the punch.

It is also possible for the recess at the transition to the annular mirror surface section to possess a tangential angle relative to the annular mirror surface section of less than 20°, and preferably less than 10°. The aforementioned tangential angle results between a tangent located directly at the transition between the recess and mirror surface section and the plane defined by the in particular flat mirror surface section, the horizontal plane when the rotary press is operating. In the aforementioned embodiment, the tangential angle is relatively small, i.e., less than 20° and preferably less than 10° (and greater than zero). The recess therefore only drops slightly relative to the mirror surface section. The recess according to the invention only must ensure that no contact with the pressure roller arises under maximum pressure in the region of the recess during a pressing process, and the mechanical weakening of the punch structure which occurs in the prior art accordingly fails to materialize. A load-optimized edge results from the small difference in the tangential angle at the transition between the flat mirror surface and recess of less than 20°. In this context, "load optimized" means that force can flow in the direction of the punch axis almost unhindered, and the edge is obtuse enough for there to be effective mechanical support when the edge is subject to load. In contrast to a vertical hole with a tangential angle of 90°, only a slight increase in stress occurs under a load (pressure) due to the effective edge support.

A (second) rounded transitional region can also be provided between the edge region and base region. The base region of the recess can also be (concavely) curved. Given a rounding of the base of the recess, for example with a rounding diameter greater than 1 mm, and given the rounded transitional region between the edge region and base region, cleaning the recess is simplified since any edges are avoided. A notch effect is also excluded.

The depth of the recess relative to the annular mirror surface section is less than 4 mm, preferably less than 2 mm, more preferably less than 1 mm. In this manner, the mechanical weakening of the punch head is minimized by the recess, and cleanability is further improved. As explained, a minimum requirement for the depth of the recess is that the base of the recess during operation does not contact the pressure rollers of a rotary press equipped with the punches.

The ratio between the depth of the recess to the diameter of the recess can be less than 2 according to another embodiment. Moreover, this largely prevents mechanical weakening of the punch structure, and the cleaning of the recess is further simplified.

The ratio between the diameter of the recess to the diameter of the annular mirror surface section can be less than 0.8 according to another embodiment which improves cleanability.

According to another embodiment, the outer contour of the recess can lie within an envelope circle with a diameter which is not greater than one-half the diameter of the region of the shaft adjacent to the punch head. The envelope circle is the smallest circle which encloses the outer contour of the recess (in particular in the plan view of the punch head). The outer contour of the recess is formed by the transition to the mirror surface section. The region of the shaft adjacent to the punch head can be a punch neck. Maintaining the aforementioned relationship ensures that the pressure can be released symmetrically between the punch axis and shaft outer diameter as explained in greater detail below. The flow of force through the transitional region between the punch head and punch shaft which functions like a notch is thereby minimized. The durability of the punch head is consequently increased.

According to another related embodiment, the (overall) contour of the recess can lie within an envelope cone, or envelope conical frustum, with a taper angle (opening angle) of at least 140° and a maximum diameter (diameter of the edge of the cone opening) which is not greater than one-half the diameter of the region of the shaft adjacent to the punch head. Again, this region of the shaft adjacent to the punch head can be formed by a punch neck. If the entire recess is enclosed by such a cone, or respectively conical frustum, the flow of force can be further optimized. The volume area of the recess thus defined ensures that the pressure can expand freely from the force introduction point at an angle of 70° in the direction of the punch axis. This leads to reduced mechanical stress and accordingly also to increased durability of the punch head.

According to another embodiment, the height of all wall sections of the recess perpendicular to the mirror surface section can be less than 1 mm. The recess can have no, one, or a plurality of wall sections that can be connected by conical frustum sections that run perpendicular to the mirror surface section. Such wall sections can form perpendicular circular cylinders. In the aforementioned embodiment, the overall height of any such wall sections is less than 1 mm. If the recess has a plurality of such wall sections, the overall height results from the sum of individual heights. If the recess only has one such wall section, the overall height corresponds to the height of this one wall section. If the recess does not have any such wall sections, the height is zero. In principle, perpendicular cylindrical component parts of the recess worsen the flow of force in the punch head. The forces that flow from the punch head toward the pressing surface are deflected by the perpendicular cylindrical component parts, and the flow of force is accordingly restricted as will be explained below. Given perpendicular wall sections that are as small as possible, force can flow nearly unhindered from the head to the pressing axis. At best, the recess does not have any perpendicular wall sections.

The invention also relates to a rotary press comprising a rotor that can be rotated by means of a rotary drive. The rotor has an upper punch guide for upper punches of the rotary press, a lower punch guide for lower punches of the rotary press and a die plate arranged between the punch guides. The punches can interact with cavities in the die plate. A filling apparatus is provided by means of which the filling material to be pressed is added to the cavities in the die plate. At least one upper pressing apparatus and at least one lower pressing apparatus that interact with the upper punches and the lower punches during operation such that they press the filling material into the cavities in the die plate. The rotary press further comprises an ejection apparatus in which the pellets generated in the cavities are ejected from the rotary press, wherein the upper and lower punches are formed in the manner according to the invention.

The at least one pressing apparatus of the rotary press can in particular have upper and lower pressure rollers which interact with the punch heads of the upper and lower punches in the aforementioned manner. In addition, the punches can be arranged in a freely rotatable manner in the punch guides. In an embodiment, the punches can have a circular cylindrical shaft without keys, or similar form-fit elements. The rotor of such a rotary press possesses, in a known manner, a rotary drive that rotatably drives the rotor, in particular the die plate with the upper and lower punches, for example by means of a drive shaft. The die plate can comprise a single piece or be constructed from individual die segments. The cavities of the die plate can be formed by holes introduced directly in the die plate, or by releasable dies inserted in seats in the die plate. In the filling apparatus, the cavities of the die plate are filled in a known manner with, for example, a powdered filling material. Then the filling material is pressed in a manner which is also known by the upper and lower punch of the rotary press in the cavities into a pellet, especially a tablet. After the pellets are expelled from the cavities, for example by the lower punch of the rotary press, the pellets are ejected from the rotary press in an ejector station. The ejector station can comprise a scraper that is arranged directly above the die plate and scrapes off the ejected pellets from the die plate rotating below the scraper toward the discharge channel

BRIEF DESCRIPTION OF THE DRAWINGS

Exemplary embodiments of the invention are explained in greater detail below with reference to figures. The drawing shows schematically in.

The same reference numbers refer to the same objects in the figures unless indicated otherwise.

DETAILED DESCRIPTION OF THE INVENTION

Figure 1:
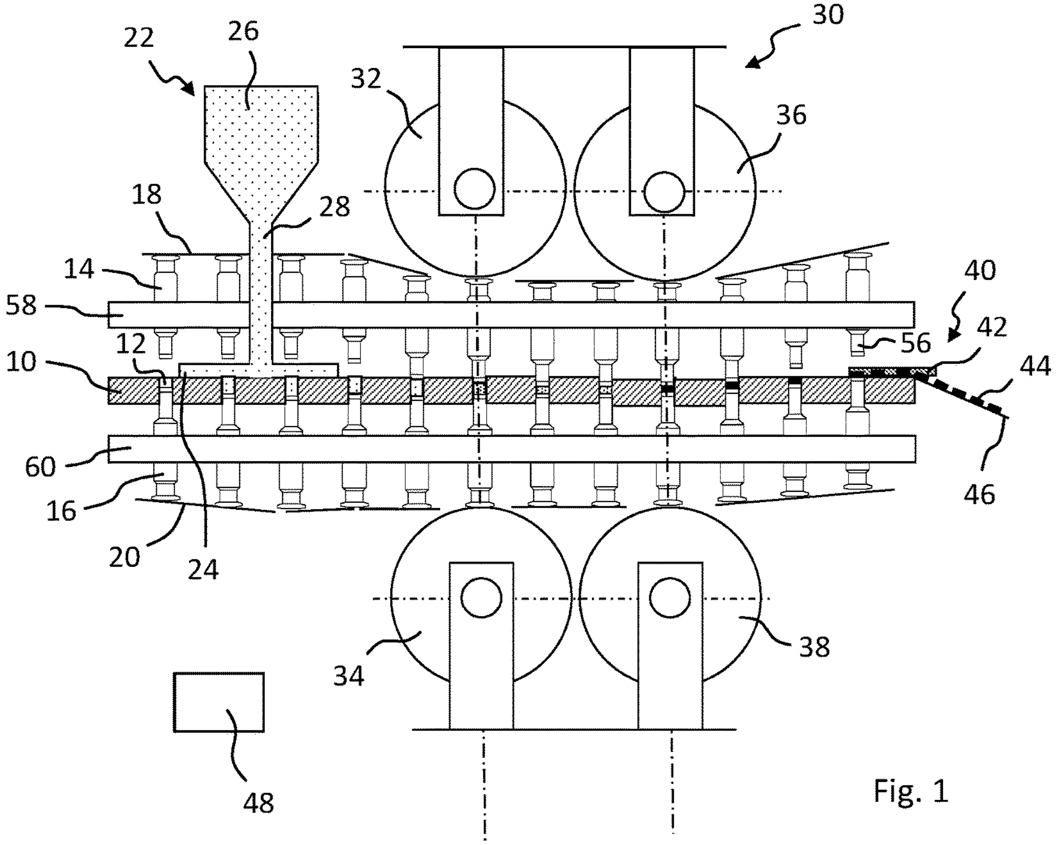
FIG. 1 illustrates a plan view of a rotor of an embodiment of a rotary press.

The rotary press shown in FIG. 1, in particular the rotary tablet press, comprises a rotor that is rotationally driven by a rotary drive (not shown) with a die plate 10 which has a plurality of cavities 12. The cavities 12 can for example be formed by holes in the die plate 10. Furthermore, the rotor comprises a plurality of upper punches 14 and lower punches 16 that rotate synchronously with the die plate 10. In each case, a pair consisting of an upper punch 14 and lower punch 16 is assigned to a cavity 12. The axial movement of the upper punch 14 and lower punch 16 during the rotation of the rotor is controlled by upper control cam elements 18 and lower control cam elements 20. The rotary press moreover comprises a filling apparatus 22 which has a filling chamber 24. The filling apparatus 22 further comprises a funnel-shaped filling material reservoir 26 which is connected by a feed section 28 to the filling chamber 24. In this manner, the powdered filling material in the present example passes under the force of gravity from the filling material reservoir 26 via the feed section 28 into the filling chamber 24, and passes therefrom via a filling opening provided in the bottom side of the filling chamber 24 into the cavities 12 of the die plate 10, again under the force of gravity.

As shown in FIG. 1, the rotary press further comprises a pressing station 30. The pressing station 30 comprises a pre-pressing apparatus with an upper pre-pressing roller 32 and a lower pre-pressing roller 34, as well as a main pressing apparatus comprising an upper main pressing roller 36 and a lower main pressing roller 38. As shown, the rotary press further comprises an ejector station 40 with a scraper 42 which supplies the pellets 44, in particular tablets, produced in the rotary press to a pellet discharge 46 for further processing.

A control apparatus for operating the rotary press is shown with reference number 48. The control apparatus 48 is connected by lines (not shown) to, inter alia, the rotary drive of the rotor.

Figure 2:
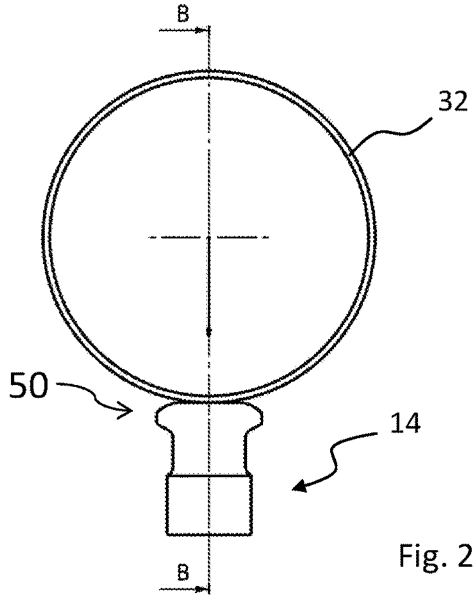
FIG. 2 illustrates an enlarged section of a an embodiment of a press punch and a pressure roller of the embodiment of the rotary press shown in FIG. 1.

FIG. 2 shows an enlarged representation of part of an upper press punch 14 as it interacts with an upper pre-pressing roller 32.

FIGS. 3-8 show an example and section of an upper punch 14 of the rotary press shown in FIG. 1. The design of the punches 14, 16 of the rotary press will be explained below with reference to an upper punch 14. In this respect, the lower punches 16 in the depicted example are designed identically.

Referring to FIGS. 2-8, each upper punch 14 has a punch head 50 on an end of a punch shaft 52. In the portrayed example, the punch shaft 52 (FIGS. 3-6, 8) has a punch neck 54 (FIGS. 3-6, 8) with a cross section that is smaller than the remaining punch shaft 52 (FIGS. 3-6, 8) section. A punch tip 56 (FIG. 1) extending into the cavities 12 of the rotary press during operation is formed on the other end of the punch shaft 52 (FIGS. 3-6, 8). Referring to FIG. 1, the punches 14, 16 of the rotary press are designed to be rotationally symmetrical and are guided to freely rotate in the upper, or respectively lower punch guide 58, 60.

Figure 3:
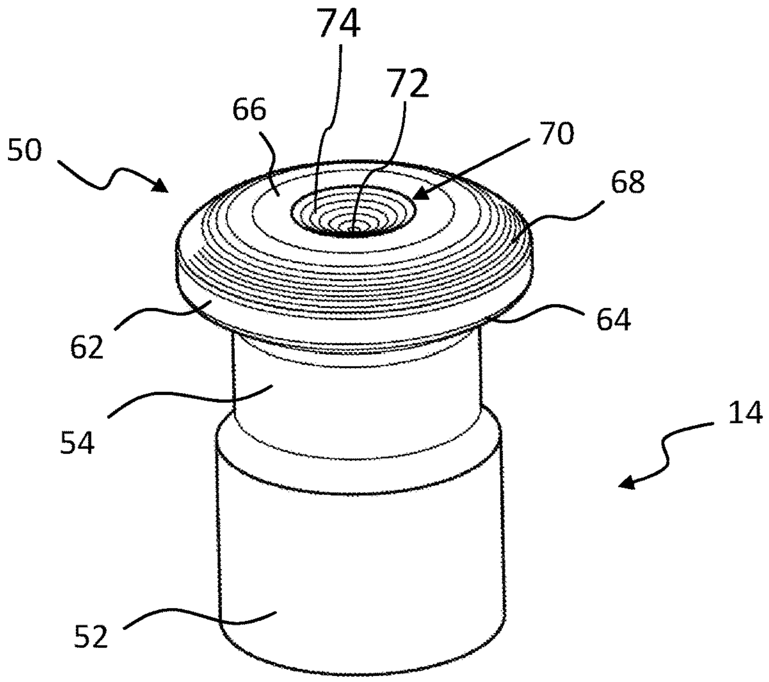
FIG. 3 illustrates an isometric view of an embodiment of a punch of the embodiment of the rotary press shown in FIG. 1.
Figure 4:
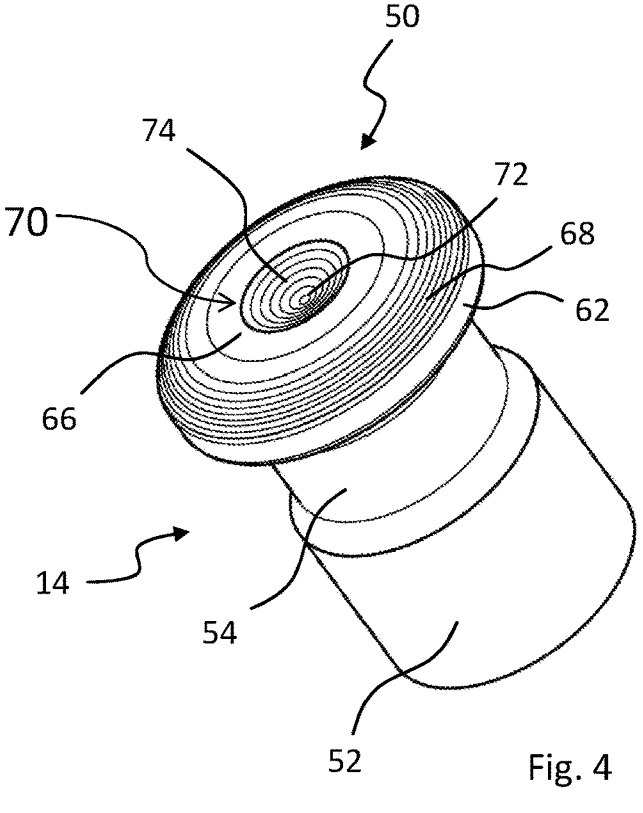
FIG. 4 illustrates an isometric view of an embodiment of a punch of the embodiment of the rotary press shown in FIG. 1.
Figure 5:
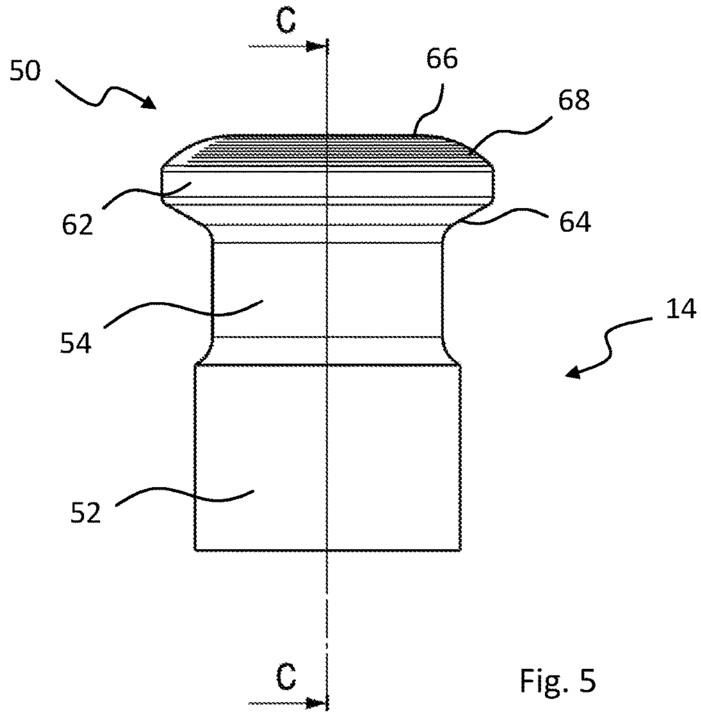
FIG. 5 illustrates a side plan view of the embodiment the punch shown in FIG. 3.
Figure 6:
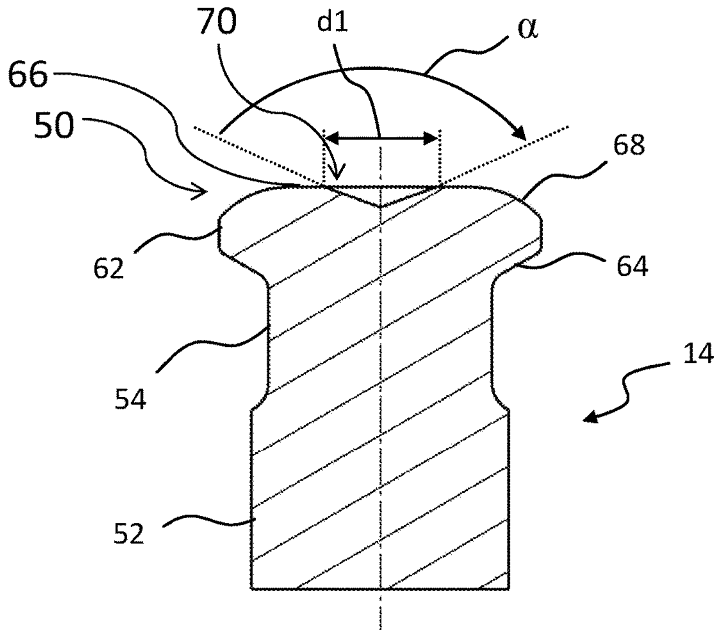
FIG. 6 illustrates a cross-sectional view along the line C-C of the embodiment of the punch shown in FIG. 5.
Figure 7:
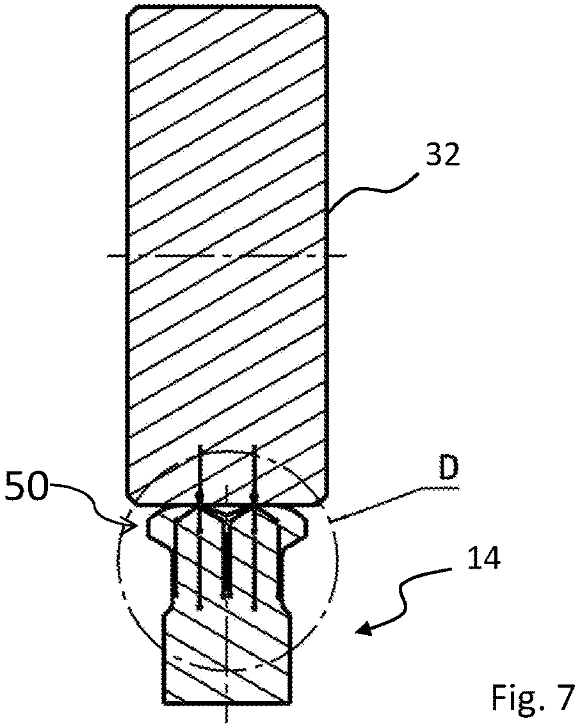
FIG. 7 illustrates a cross-sectional view along the line B-B of the embodiment of the press punch and the pressure roller shown in FIG. 2.

Height lines are depicted on the top side of the punch head 50 in FIGS. 3-5 for the sake of illustration. In the embodiments of FIGS. 3-5, the punch head 50 comprises a cylindrical surface 62 that transitions via a conical intermediate region 64 into the punch neck 54 of the punch shaft 52. On the top side of the punch head 50, there is a annular mirror surface section 66, which is flat. The annular mirror surface section 66 and cylindrical surface 62 are connected to each other by a rounded intermediate region 68. Referring to FIGS. 3-5, the flat, annular mirror surface section 66 borders a recess 70. In the embodiments of FIGS. 3-4, the recess 70 possesses a closed base region 72 and an edge region 74 which terminates in the annular mirror surface section 66 and is configured to be conical, or respectively frustoconical. Referring to FIG. 6, it can be seen that the recess 70 can have a conical shape, or respectively frustoconical shape. As shown in FIGS. 3-4, between the edge region 74 and the annular mirror surface section 66, there can also be a rounded transitional region which in particular can be tangentially continuous or continuously curved relative to the annular mirror surface section 66.

Figure 8:
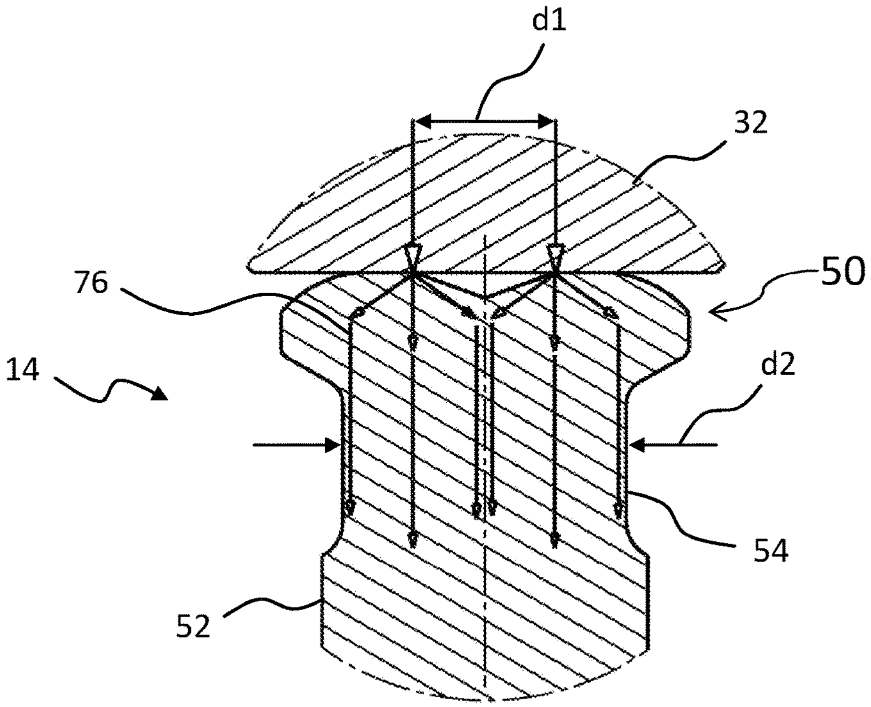
FIG. 8 illustrates an enlarged cross-sectional view of detail D from FIG. 7.

Referring to FIG. 6, the contour of the recess 70 lies within a cone with a taper angle $\alpha$ (opening angle) that is about 140° in the portrayed example. The outer contour of the recess 70 which is formed in the portrayed example by the inner edge of the annular mirror surface section 66 bordering the recess 70 lies on an envelope circle with the diameter d1 (see FIGS. 6 and 8). In FIG. 8, it can also be seen that the punch neck 54 has a diameter d2. In the depicted example, d1=½ d2. By means of this embodiment, pressures introduced into the punch head during operation, in particular in the region of the edge of the recess 70, can be very evenly introduced in the punch shaft 52, in particular the punch neck 54, while interacting with the upper pre-pressing roller 32 as illustrated in FIG. 8 by the force lines 76. As shown in FIG. 8, the pressure arising during operation is accordingly divided evenly to the left and right of the recess 70 and is homogeneously conducted in the punch shaft. To the extent that d1 is smaller than d2, introduction of pressure in the direction of the shaft axis is increased. This is also not problematic in principle for the stability of the punch 14.

Figure 9:
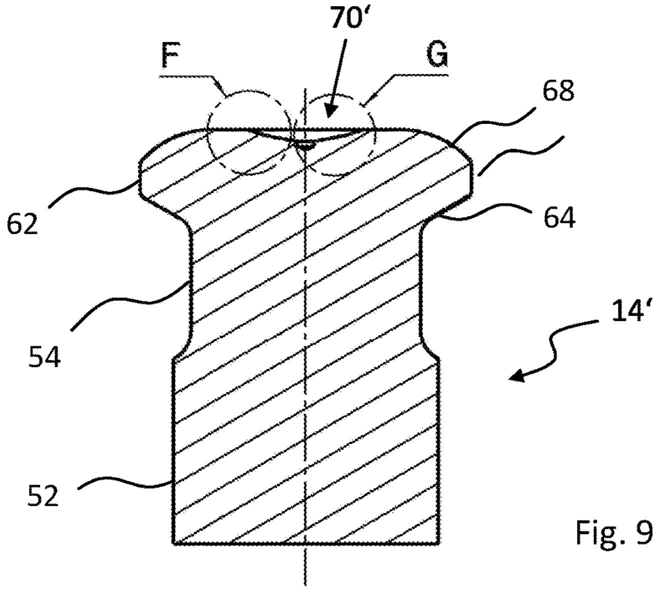
FIG. 9 illustrates a cross-sectional view of another embodiment of the punch.
Figure 10:
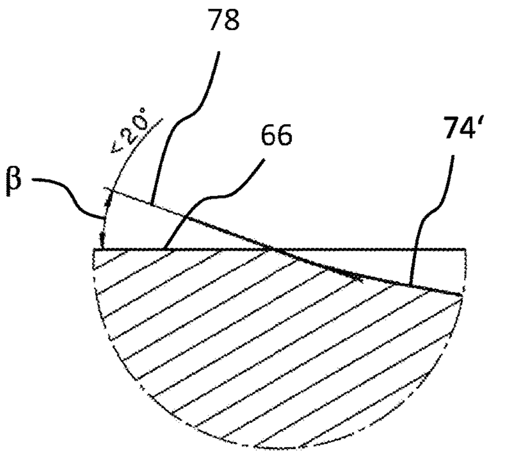
FIG. 10 illustrates an enlarged cross-sectional view of detail F from FIG. 9.
Figure 11:
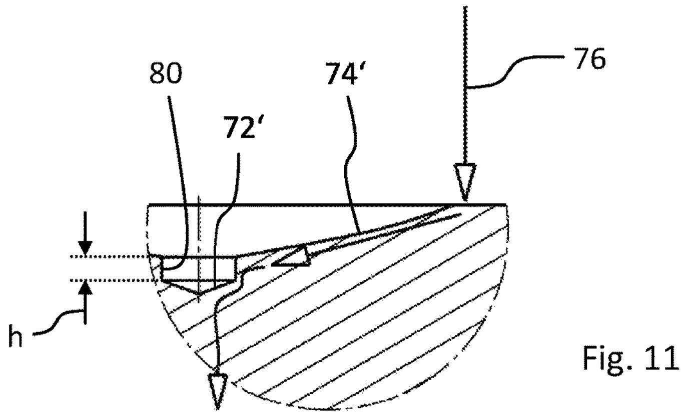
FIG. 11 illustrates an enlarged cross-sectional view of detail G from FIG. 9.

FIGS. 9-11 show another embodiment of an upper punch 14' which can be used in the rotary press according to FIG. 1. The same correspondingly holds true for the lower punches (not shown).

The upper punch 14' shown in FIGS. 9-11 differs from the upper punch 14 shown in FIGS. 2-8 only in terms of the geometry of the recess 70'. Accordingly, the edge region 74' (FIGS. 10-11) of the recess 70' is curved slightly concavely, and the recess 70' possesses a central hole with a perpendicular cylindrical wall section 80 (FIG. 11) and a base region 72' (FIG. 11). As can be seen in particular in FIG. 10, the recess 70' at the transition to the annular mirror surface section 66 possesses a tangential angle β between a tangent 78 placed in this region and the annular mirror surface section 66 of less than 20°. A strong edge in the region of the transition is thereby avoided, which otherwise could cause stress peaks and hence the danger of a premature failure of the punch head.

As can be seen in FIG. 11, the height (h) of the perpendicular cylindrical wall section 80 which is perpendicular relative to the annular mirror surface section 66 is also relatively small; in the present example, less than 1 mm. Such perpendicular wall sections pose in principle a barrier for the introduced force as can be seen with reference to the force lines 76 drawn in FIG. 11. Accordingly, the perpendicular cylindrical wall section 80 causes a necessary deflection of the introduced force which can have a negative effect. Consequently, the height (h), assuming that perpendicular wall sections are provided, should be as small as possible.

By providing the recesses 70, 70' in the punch heads 50, a more even load on the punch heads 50 and the upper and lower pressing rollers 32, 34, 36, 38 interacting with them is achieved so that the life of the punches 14, 14', 16 is increased without impairing the durability of the punches 14, 14', 16. The wear of the pressing rollers 32, 34, 36, 38 and the rotary press overall is reduced, and the generated noise is reduced.

REFERENCE NUMBER LIST

10 Die plate
12 Cavities
14 Upper punch
14' Upper punch
16 Lower punch
18 Upper control cam elements
20 Lower control cam elements
22 Filling apparatus
24 Filling chamber
26 Filling material reservoir
28 Feed section
30 Pressure station
32 Upper pre-pressing roller
34 Lower pre-pressing roller
36 Upper main pressing roller
38 Lower main pressing roller
40 Ejector station
42 Scraper
44 Pellets
46 Pellet discharge
48 Control apparatus
50 Punch head
52 Punch shaft
54 Punch neck
56 Punch tip
58 Upper punch guide
60 Lower punch guide
62 Cylindrical surface
64 Conical intermediate region
66 Annular mirror surface section
68 Intermediate region
70 Recess
70' Recess
72 Base region
72' Base region
74 Edge region
74' Edge region
76 Force lines
78 Tangent
80 Perpendicular cylindrical wall section

The invention claimed is:

1. A punch for a rotary press comprising:
a shaft comprising,
a punch tip at a first end of the shaft, and
a punch head at a second end of the shaft, the punch head further comprising
an annular mirror surface section surrounding a recess having one end which is open and a second end which is closed across the opening,
a cylindrical surface, and
an intermediate region disposed between the annular mirror surface and cylindrical surface.

2. The punch according to claim 1, wherein the recess further comprises an edge region configured to surround a base region.

3. The punch according to claim 2, wherein the edge region is a conical frustum or a cone.

4. The punch according to claim 2, wherein a tangentially continuous transitional region is disposed between the edge region and the annular mirror surface.

5. The punch according to claim 2, wherein a continuously curved transitional region is disposed between the edge region and the annular mirror surface.

6. The punch according to claim 4, wherein an angle (β) between a tangent at the tangentially continuous transitional region and the annular mirror surface section is less than 20°.

7. The punch according to claim 4, wherein an angle (β) between a tangent at the tangentially continuous transitional region and the annular mirror surface section is less than 10°.

8. The punch according to claim 1, wherein a depth of the recess relative to the annular mirror surface is less than 4 mm.

9. The punch according to claim 1, wherein a depth of the recess relative to the annular mirror surface is less than 1 mm.

10. The punch according to claim 1, wherein a ratio between a depth of the recess to a diameter (dl) of the recess is less than 2.

11. The punch according to claim 1, wherein a ratio between a diameter (d1) of the recess to a diameter of the annular mirror surface is less than 0.8.

12. The punch according to claim 1, wherein an outer contour of the recess is disposed within an envelope circle with a diameter (d1) which is not greater than one-half a diameter (d2) of a region of the shaft adjacent to the punch head.

13. The punch according to claim 1, wherein a contour of the recess is disposed within an envelope cone, or envelope conical frustum, with a taper angle (α) of at least 140° and a maximum diameter (d1) which is not greater than one-half a diameter (d2) of a region of the shaft adjacent to the punch head.

14. The punch according to claim 1, wherein a height (h) of all wall sections of the recess perpendicular to the annular mirror surface section is less than 1 mm.

15. A rotary press comprising:

a rotor configured to be rotated by means of a rotary drive, the rotor comprising an upper punch guide configured to guide upper punches of the rotary press, a lower punch guide configured to guide lower punches of the rotary press, and a die plate disposed between the upper and lower punch guides having a plurality of cavities configured to interact with the upper and lower punches;

a filling apparatus configured to add filling material to the plurality of cavities in the die plate;

at least one upper pressing apparatus and at least one lower pressing apparatus configured to interact with the upper punches and the lower punches during operation to press the filling material into the plurality of cavities in the die plate; and an ejection apparatus configured to eject pellets generated in the plurality of cavities from the rotary press, wherein at least one of the punches of the rotary press comprise a shaft having a punch head at one end of the shaft, the punch head comprising an annular mirror surface section surrounding a recess having one end which is open and a second end which is closed across the opening, a cylindrical surface, and an intermediate region disposed between the annular mirror surface and cylindrical surface.

* * * * *